Patented July 24, 1923.

1,463,122

UNITED STATES PATENT OFFICE.

WILLIAM BURNS LOGAN, OF DE QUINCY, LOUISIANA, ASSIGNOR TO ACME PRODUCTS COMPANY, INC., OF NEW ORLEANS, LOUISIANA, A CORPORATION OF LOUISIANA.

PROCESS FOR MAKING TURPENTINE SUBSTITUTE AND PRODUCT THEREFROM.

No Drawing.   Application filed November 23, 1922.   Serial No. 602,887.

*To all whom it may concern:*

Be it known that I, WILLIAM BURNS LOGAN, a citizen of the United States, residing at De Quincy, in the parish of Calcasieu and State of Louisiana, have invented certain new and useful Improvements in Processes for Making Turpentine Substitute and Product Therefrom, of which the following is a specification.

The present invention relates to a novel turpentine substitute and to a process of making the same from material such as pine oil. Pine oil, as is well known, is a liquid composed of about 80% terpineol, about 5% or so of borneol, about 2% of fenchyl alcohol, and about 5% of limonene. This material is sometimes sold as a substitute for turpentine, but for most of the purposes for which turpentine is used, pine oil is not a good substitute.

I have found that pine oil can be converted into a product suitable for use as a turpentine substitute, by a simple and efficient process as described below, the turpentine substitute being for practically all of the uses of turpentine, as good as actual gum turpentine, and can be produced at a somewhat lower cost.

In carrying out the process of the present invention, I vaporize the pine oil, either fractionally or instantaneously in a suitable boiler or still. The vapors of the pine oil are then conducted through a contact chamber in which they are subjected to the action of a catalyzer, the catalyzer consisting preferably of a chloride of copper, and especially cuprous chloride, although cupric chloride can also be used as well as aluminum chloride, and many other metal chlorides. Hydrochloric acid can also be employed. The temperature at which the pine oil vapor is subjected to the action of the catalyzer should not be below 225° C., nor above 350° C., and in order to produce the best results I prefer to maintain the temperature of the catalyzer chamber at about 250 to 275° C. At the temperatures stated, the major part of the terpineol and some of the borneol are dehydrated, and produce dipentene and other terpenes. Also within the most favorable temperature range, some of the fenchyl alcohol seems to be converted into dipentene. At temperatures below 225° C. the reaction does not seem to take place to any substantial extent, and at temperatures above 350° C., other undesirable reactions take place to a considerable extent, which produce products having objectionable odors. Even at temperatures between 275 and 350° C., there are some products formed having objectionable odors.

The vapors leaving the catalyzer chamber are then conducted to a condenser in which all of the vapors are condensed or as much as possible of the vapors are condensed, thereby producing a liquid, which upon standing settles into two layers, an aqueous layer, and an oily layer. The aqueous layer is removed and discarded. The oily layer, which consists of a mixture of unconverted pine oil and turpentine substitute, is then subjected to fractional distillation, and the portion which passes over below 200° C., is separately collected, and this constitutes the turpentine substitute. The residue from the distillation can be rerun through the catalyzer chamber or can be used for any other suitable purpose.

As is well known, pine oil is a liquid having a specific gravity between about .93 and .945 generally averaging about .933. The turpentine substitute prepared from ordinary pine oil, when subjected to fractional distillation, will produce about 80% of the distillation of the pine oil, in the form of turpentine substitute. This turpentine substitute contains about 90% dipentene. It will begin to boil at about 170° C., and about 75% of it will distill over below 180° C., and about 95% of it will distill over below 190° C. Its specific gravity will be found to be between .85 and .86. Its index of refraction will be about 1.475 to 1.477 at 20° C. The liquid will be of the same color as standard gum turpentine or standard wood turpentine.

The odor of this new turpentine substitute is similar to that of wood turpentine, with usually a noticeable odor of limonene. However when temperatures about 275° C. are used in the catalyzer chamber, small quantities of other terpene compounds are produced which have an unpleasant odor.

The catalyzer as has been stated contains in all cases a chloride, either a metal chloride or hydrochloric acid. Cuprous chloride has given the most favorable results, and this can be used alone as the catalyzer or can be precipitated upon suitable carriers, such as ground pumice or silico-gel, or fine mesh copper gauze. The use of a carrier material for the active catalyzer is advisable, as giving more extended surface contact. The pine oil apparently must be in the form of a vapor and so far as I have been able to ascertain the reaction will not take place with the pine oil in a liquid form. If the vapors of pine oil are diluted, by mixing any vapors or other inert liquids, such as water or other oils, or inert gases, such as nitrogen, the reaction will still take place but much more slowly. Hydrochloric acid is less suitable as a catalyzer, since even at the preferred temperatures, it produces a small quantity of bad smelling terpene compounds.

It will be understood that the invention is not restricted to the specific details above given, but the invention embraces modifications within the scope of the appended claims.

The chemical composition of gum and wood turpentine is principally pinene; gum turpentine containing about 95 per cent pinene, wood turpentine 85 per cent, the remaining being other terpenes.

The special turpentine made from pine oil—the principal constituent will be dipentene, amounting to about 90 per cent of its volume, the remainder being a mixture of other terpenes. Its specific gravity will fall between .85 and .86. Its index and refraction will be about 1.475 to 1.477 at 20 degrees C. Its initial boiling point will be about 170 degrees C. and about 75 per cent will distill below 180 C. and 95 per cent will distill below 190 C.

I claim:—

1. A process of making a turpentine substitute which comprises subjecting vapors of pine oil to the action of a catalyst comprising a copper chlorid, at a temperature between about 225° and 350° C., condensing the vapors, separating water therefrom, fractionally distilling the condensate, and collecting the fraction distilling up to about 200° C.

2. A process of making a turpentine substitute which comprises subjecting vapors of pine oil to the action of a catalyst comprising a copper chlorid, at a temperature between about 250° and about 275° C., condensing the vapors, separating water therefrom, fractionally distilling the condensate, and collecting the fraction distilling up to about 200° C.

3. A process of making a turpentine substitute which comprises subjecting vapors of pine oil to the action of a catalyst comprising a copper chlorid, at a temperature between about 250° and about 275° C.

4. A process which comprises subjecting vapors of pine oil to the action of a catalyst comprising a chlorid at about 225 to 350° C.

5. A process which comprises subjecting vapors of pine oil to the action of a catalyst comprising a chlorid, at about 250 to 275° C.

6. A process which comprises subjecting vapors of pine oil to the action of a catalyst comprising a copper chlorid, at about 225 to 350° C.

7. A process which comprises subjecting vapors of pine oil to the action of a catalyst comprising cuprous chlorid at about 225 to 350° C.

8. A turpentine substitute, which comprises a liquid material of turpentine-like appearance, having a specific gravity between .85 and .86, containing about 90% of dipentenes, having an index of refraction of about 1.475 to 1.477 at 20° C., such material boiling at about 175° C., about 75% of the whole boiling below 180° C., and 95% boiling at not above 190° C.

9. A process which comprises passing vapors containing terpineol in contact with a chlorid catalyst between 225 and 350° C., whereby dipentene compounds are formed.

10. A process which comprises passing vapors containing terpineol in contact with a chlorid catalyst between 250 and 275° C., whereby dipentene compounds are formed.

WM. BURNS LOGAN.